(12) United States Patent
Meyer

(10) Patent No.: US 7,823,362 B2
(45) Date of Patent: Nov. 2, 2010

(54) SPLICE PLATE FOR STRINGERS AND ORBITAL JOINING DEVICE

(75) Inventor: Cedric Meyer, Fonsorbes (FR)

(73) Assignee: Airbus France, Toulouse (FR)

( * ) Notice: Subject to any disclaimer, the term of this patent is extended or adjusted under 35 U.S.C. 154(b) by 179 days.

(21) Appl. No.: 11/855,197

(22) Filed: Sep. 14, 2007

(65) Prior Publication Data

US 2008/0067289 A1 Mar. 20, 2008

(51) Int. Cl.
*E04B 1/38* (2006.01)

(52) U.S. Cl. .......................... 52/713; 52/655.1; 52/665; 244/120

(58) Field of Classification Search ................ 52/655.1, 52/653.1, 713, 223.12, 245, 506.07, 665; 244/119, 120
See application file for complete search history.

(56) References Cited

U.S. PATENT DOCUMENTS

| | | | | |
|---|---|---|---|---|
| 1,329,427 A * | 2/1920 | Otto | ........................... | 52/127.8 |
| 2,276,391 A * | 3/1942 | Hathorn | ...................... | 403/346 |
| 2,382,358 A * | 8/1945 | Watter | ........................ | 244/131 |
| 2,387,219 A * | 10/1945 | Wallis | ..................... | 244/117 R |
| 2,840,200 A * | 6/1958 | Wong | .......................... | 403/347 |
| 2,945,653 A * | 7/1960 | Atkin | ......................... | 244/119 |
| 3,039,695 A * | 6/1962 | Harmsen | .................... | 238/117 |
| 3,600,016 A * | 8/1971 | Dilley | ........................ | 403/389 |
| 3,972,168 A * | 8/1976 | Allen | ........................... | 52/698 |
| 3,976,269 A * | 8/1976 | Gupta | ........................ | 244/119 |
| 4,310,132 A * | 1/1982 | Frosch et al. | ................ | 244/119 |
| 4,606,961 A * | 8/1986 | Munsen et al. | ............... | 428/119 |
| 4,633,632 A * | 1/1987 | Sarh | ............................ | 52/245 |
| 5,242,523 A * | 9/1993 | Willden et al. | .............. | 156/285 |
| 5,518,208 A * | 5/1996 | Roseburg | .................... | 244/132 |
| 5,700,337 A * | 12/1997 | Jacobs et al. | .................. | 156/64 |
| 5,806,797 A * | 9/1998 | Micale | ........................ | 244/120 |
| 6,003,812 A * | 12/1999 | Micale et al. | ........... | 244/117 R |
| 6,581,343 B1 * | 6/2003 | Metelli | ...................... | 52/223.9 |
| 6,648,273 B2 * | 11/2003 | Anast | ......................... | 244/119 |
| 6,766,984 B1 * | 7/2004 | Ochoa | ........................ | 244/119 |
| 6,862,854 B1 * | 3/2005 | Fitzmyers | .................... | 52/291 |
| 7,025,305 B2 * | 4/2006 | Folkesson et al. | ....... | 244/117 R |
| 7,325,771 B2 * | 2/2008 | Stulc et al. | .................. | 244/119 |
| 7,530,531 B2 * | 5/2009 | Wood et al. | .............. | 244/129.3 |
| 2003/0080251 A1 * | 5/2003 | Anast | ......................... | 244/119 |

FOREIGN PATENT DOCUMENTS

| | | |
|---|---|---|
| DE | 102004035170 B3 | 8/2005 |
| EP | 0048191 A1 | 3/1982 |
| GB | 524721 | 8/1940 |
| GB | 573725 | 12/1945 |

* cited by examiner

*Primary Examiner*—Richard E Chilcot, Jr.
*Assistant Examiner*—James Ference
(74) *Attorney, Agent, or Firm*—Perman & Green LLP

(57) ABSTRACT

A splice plate for stringers designed to connect two adjacent stringers at least three independent pieces, a connection rod being designed to be fixed by two opposite extremities to two adjacent stringers, and at least two connecting plates, each connecting plate being designed to be fixedly joined to a first extremity of one of the two stringers, and by a second extremity of a cross bar disposed between the two stringers. The disclosed embodiment also relate to a device for orbital fixation including at least one stringer splice plate splice bar.

16 Claims, 3 Drawing Sheets

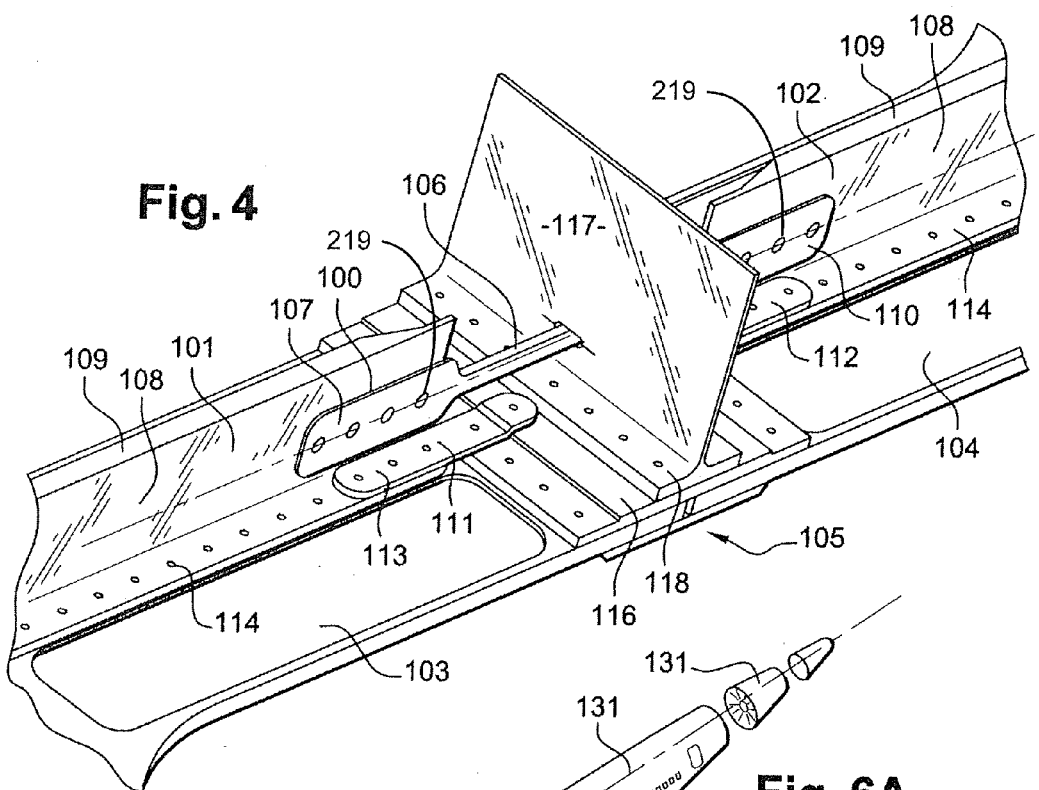
Fig. 4
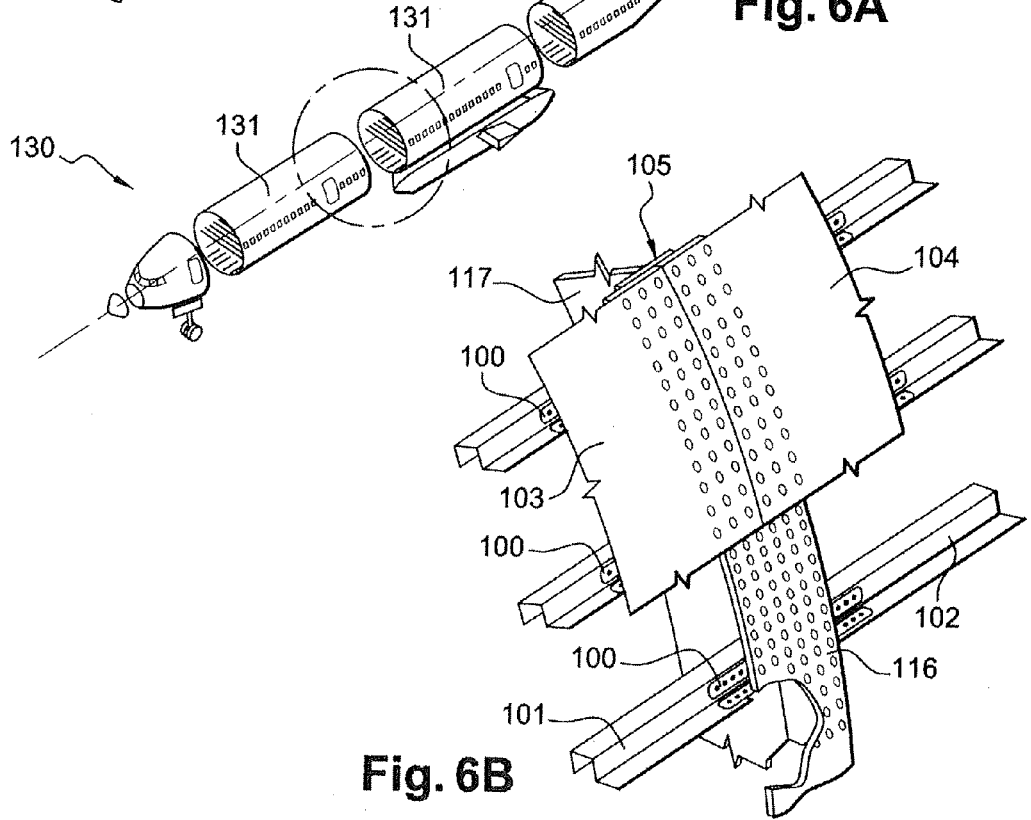
Fig. 6A
Fig. 6B

SPLICE PLATE FOR STRINGERS AND ORBITAL JOINING DEVICE

BACKGROUND

1. Field

The disclosed embodiments relate to a splice plate for stringers or "stringer splice plate" designed to connect two adjacent stringers. The term "stringer splice plate" is understood to mean a part designed to provide the linkage and alignment of two stringers that are adjacent (i.e. side by side or one in the extension of the other) and the transmission of certain stresses between these two stringers, said stringers being positioned along the longitudinal profile of a structure for which they provide the stiffening. The disclosed embodiments also relate to an orbital joining device designed to fixedly join two adjacent panels of an aircraft fuselage, said orbital joining device comprising at least one stringer splice.

The stringer splice plate according to the disclosed embodiments can be used in all fields where it is required to physically link two adjacent parts so as to maintain the link, alignment and transmission of certain stresses between these two parts.

For example, the stringer splice plate according to the disclosed embodiments can be applied in railroads in order to fixedly join two rails positioned one in the extension of the other, or in aeronautics to fixedly join rails for seats or for all sorts of stiffeners extending along the internal structure of an aircraft.

The orbital joining device of the disclosed embodiments can be applied more particularly in aeronautics. The term "orbital joining" is understood to mean a link between two panels belonging to two adjacent fuselage sections, perpendicularly to the axis of the aircraft.

At present, in aeronautics, there are known ways of connecting two longitudinal stringers positioned one in the extension of the other and facing each other by means of a one-piece stringer splice plate.

2. Description of the Prior Art

In general, and as can be seen in FIGS. 1 and 2 pertaining to the prior art, a cross-piece bar or sleeve is positioned transversely between two panels 1, 2 facing each other on an entire side. The cross-bar 3 is positioned in the zone 4 of attachment between the two panels 1, 2 which do not overlap one another so as to provide for the joining and continuity of the transfer of the stresses and forces along said panels. A vertical frame 5 extends vertically on the collar 3, so as to rigidify the assembly of the link between the two panels 1, 2.

The two stringers 6, 7 facing each other are each fixed to a different panel 1, 2 which they stiffen. In order to maintain the alignment between the two stringers 6, 7, they are linked to each other in a known way by a one-piece stringer splice plate 8, 9.

In FIG. 1 corresponding to the prior art, the one-piece stringer splice plate 8 is fixed by a first extremity 10 to the first stringer 6 and by a second extremity 11, opposite the first end, to the second stringer 7. The body 12 of the stringer splice plate thus connects the two stringers 6, 7 so as to provide longitudinal continuity. Furthermore, the stringer splice plate 8 is fixed to at least two points of the sleeve 3, on either side of the vertical frame 5. Thus, a single-piece unit is fixed to the two stringers 6, 7, the sleeve 3 and the vertical frame 5.

The vertical frame 5 is provided with a vertical notch 13 designed to let through the body 12 of the one-piece stringer splice plate 8. The notch 13 extends vertically along a partial height h of the vertical frame 5, from the base 14 of said vertical frame 5.

FIG. 2 pertaining to the prior art shows another mode of fixation of the two panels 1,2 as currently used in aeronautics, also comprising a sleeve 3 and a vertical frame 5.

The stringer splice plate 9 which connects two adjacent stringers 6, 7 is fixed by a first extremity 15 to the first stringer 6 and by a second extremity 16, opposite the first end, to the second stringer 7. The body 17 of the stringer splice plate extends between the two stringers 6, 7 in the extension of said stringers 6, 7 so as to provide for longitudinal continuity.

In this second embodiment, the vertical frame 5 is clipped above the body 17 of the stringer splice plate 9 so as to preserve its integrity. To this end, vertical plates 18 are positioned on either side of the stringer splice plate and fixedly joined to the sleeve 3 so as to extend vertically relative to said sleeve 3. The vertical frame 5 extends vertically above said vertical plates 18. A top extremity 19 of each plate 18 is fixedly joined to a lower extremity 20 of the vertical frame 5. The body 17 of the stringer splice plate 9 straddles the attachment zone 4 between the two panels 1, 2 at the level of the space made between the two vertical plates 18 and the vertical frame 5.

The prior art stringer splice plates 8, 9 have many drawbacks.

In particular, because of their single-piece structure and complex geometry, the prior art stringer splice plates are difficult to machine. The part has to be machined by arranging for several support surfaces, since one and the same piece is fixed to several elements with different orientations. These variations in the orientation of the fibers of the stringer splice plates generates major secondary bending moments which make it difficult to design and size these stringers and make said splice plates very sensitive to fatigue. Inasmuch as the stringer splice plates in particular have a function of transferring the longitudinal stresses induced by the bending of the panels to which they are fixed and provide them with continuity, they tend to rapidly suffer cracks at fatigue-critical sites. These fatigue-critical sites develop chiefly at the splice plate/stringer junctions and on the body of the stringer splice plate situated in the zone of attachment between the two panels. Furthermore, the fact of machining the stringer splice plates in the mass, i.e. out of a thick bar, causes said stringer splice plates to have weak mechanical characteristics. It is known that the characteristics of the materials deteriorates when the thicknesses of the semi-finished products increases.

The prior art orbital joining device, comprising a stringer splice plate 8,9 a sleeve 3 and a vertical frame 5 to join two stringers extending on adjacent panels has several drawbacks.

For example, should the vertical frame 5 be perforated to let through the body 12 of the stringer splice plate 8, the entire structure is penalized from the viewpoint of mass. During the sizing of the vertical frame 5, the designs made to achieve mechanical strength are done at the minimum height of the frame 5, i.e. in the upper part of said vertical frame 5 which is not crossed by the vertical notch 13 for passage of the stringer splice plate 8. Thus, all the matter of the vertical frame that is situated in the partial height h of the vertical frame 5, situated beneath the tip of said notch 13, is not taken into account for calculating mechanical strength. All this material is considered to be non-working. The vertical frame 5 is therefore over-sized. Thus, should the notch 13 extends over 27 mm of a height h, it is necessary to make a vertical frame 5 with a the total height of 90 mm to ensure at least 63 mm of working height. The term "total height" is understood to mean the size of the frame 5 extending vertically from the base 14 to the peak of said frame 5.

Should the vertical frame 5 be clipped above the stringer splice plate 9, the presence of the additional sheeting elements 18 also tends to increase the mass of the fixation device as a whole.

It is an aim of the disclosed embodiments to provide a stringer splice plate that is of simple design, easy to manufacture and has high fatigue strength. It is another aim of the disclosed embodiments to provide an orbital joining device capable of at least partially resolving all or part of the problems explained here above.

To this end, the stringer splice plate of the disclosed embodiments is not a one-piece unit but, on the contrary, formed out of several independent parts, simple in shape and easy to make. The term "independent" is understood to mean physically and structurally independent as opposed to being made in one piece, i.e. they are not directly fixedly joined to one another and work independently of one another. More specifically, the stringer splice plate of the disclosed embodiments has at least three structurally independent elements each designed to be linked to different parts. Thus, a main element, designed to be fixed to the two adjacent stringers, only provides for the link between the two stringers. The link between each of said stringers and the structure to which they are fixed is provided by two other secondary elements which are also independent. Each of the two secondary elements of the stringer splice plate of the disclosed embodiments is, firstly, connected to only one of the two stringers and, secondly, to the structure along which said stringer extends. Each of the elements of the stringer splice plate works independently of the others, so as to separately take up the bending forces borne by the parts to which they are fixed. The stringer splice plate of the disclosed embodiments is simple to make since, by its geometry, each element is manufactured independently of the others. Each element has a limited number of support surfaces. Advantageously, each of said elements has a single support surface. The fatigue strength of the stringer splice plate of the disclosed embodiments is high because of the shape of the different elements that form it is not uneven and because of the separate absorption of bending or other forces. Furthermore, the stringer splice plate of the disclosed embodiments is easy to mount. Each of the elements of the stringer splice plate of the disclosed embodiments is designed to be connected to different parts, independently of the other two elements of the stringer splice plate. This provides for greater flexibility of assembly and especially enables compensation for any possible clearance between the two stringers that have to be fixedly joined to each other.

The orbital joining device of the disclosed embodiments, designed to fixedly join the two fuselage panels that face each other, perpendicularly to the longitudinal axis of said fuselage, comprises at least one stringer splice plate according to the disclosed embodiments, one vertical frame and one cross-piece extending transversely between the two panels to be fixedly joined. Thus, the fixing device of the disclosed embodiments has highly fatigue strength. Furthermore, since only the main element of the stringer splice plate, designed to connect two facing stringers longitudinally, must go through the vertical frame extending between the two panels, the notch for the passage of the stringer splice plate can be small in size. It is thus possible to reduce the section of the vertical frame considered as being a non-working part during the sizing of said vertical frame, thus providing especially for a major gain in mass.

SUMMARY

The disclosed embodiments are directed to a stringer splice plate designed to connect two adjacent stringers, comprising at least three independent parts, one connection rod being designed to be fixed by two opposite extremities to the two adjacent stringers, and at least two joining plates, each joining plate being designed to be fixedly joined by a first extremity of one of the two stringers, and by a second extremity of a cross-piece positioned between the two stringers.

The term "adjacent" is understood to mean that the two stringers can extend side by side or one in the longitudinal extension of the other. The three independent parts extend structurally and physically, i.e. so as not to be directly and fixedly joined to each other, and so as to work independently of each other. Thus, each of these parts, independently of the other part, takes up the bending forces to which the others may be subjected.

The length of the connection rod is at least equal to the distance between the two stringers between which they extend so that they can be fixedly joined to each of these stringers. The term "length" is understood to mean the size of the connection rod extending in parallel to the longitudinal axis of the splice stringer bar.

The cross-piece positioned between the two stringers may extend in parallel to the other stringers; should the two stringers be positioned side by side, or they extend transversely between the two stringers if the two stringers should be positioned one in the extension of the other and if they face each other.

Depending on exemplary embodiments of the stringer splice plates, it is possible to plan for all or part of the following additional characteristics:

the first extremity of the joining plate can be fixedly joined to the flange of a stringer, so as to extend at least partially along the flange and in the extension of said flange.

The term "stringer flange" is understood to mean the bed-plate of this stringer at the position where the stringer is fixedly joined to the structure to be stiffened. The web of the stringer extends vertically on said flange.

the connection rod comprises at least one rigid bar designed to extend between the two stringers.

The rigid bar can be made of aluminum, titanium, steel or any other material depending on the user's needs.

the connection rod has at least one cable designed to extend between the two stringers.

at least one extremity of the connection rod is capable of being connected to the web of a stringer.

at least one extremity of the connection rod comprises at least one flat tie designed to be attached to the web of a stringer, so as to extend along said web.

The disclosed embodiment are also directed to an orbital adjoining device to fixedly join two fuselage panels facing each other, perpendicularly to the longitudinal axis of said fuselage, comprising at least one stringer splice plate capable of fixedly joining two longitudinal stringers each extending on a different fuselage panel and facing each other.

Depending on embodiments of the orbital adjoining device of the disclosed embodiments, it is possible to plan for all or part of the following additional characteristics:

the connection rod of the stringer splice plate goes through a vertical plane extending transversely relative to the longitudinal axis of the stringer splice plate, said vertical frame being designed to be positioned in the zone of attachment of the two fuselage panels, between the two facing stringers.

the two joining plates are positioned on either side of a vertical frame extending transversely relative to the longitudinal axis of the stringer splice plate, said vertical frame being designed to be positioned in the zone of attachment of the two fuselage panels, between the two stringers facing each other.

the vertical frame is provided with a through hole capable of letting through the connection rod of the stringer splice plate.

the through hole comprises a hole with a diameter substantially equal to the diameter of the rigid bar and/or the cable of the connection rod that goes through it, and two slots, made around the hole and opening into the hole, the size of the orifice that extends between the two slots being substantially equal to the size of one extremity of the connection rod, so as to permit the passage of said extremity through the vertical frame.

the slots extend in parallel to the longitudinal axis of the vertical frame.

BRIEF DESCRIPTION OF THE DRAWINGS

The disclosed embodiments will be understood more clearly from the following description and from the accompanying figures. These figures are given by way of an indication and in no way restrict the scope of the disclosed embodiments. Of the figures:

FIGS. 3 and 4 provide two schematic views of a stringer splice plate according to a first embodiment;

FIG. 6A is a schematic view of the successive fuselage sections of an aircraft, at the level at which the orbital joining device of the disclosed embodiments can be used.

FIG. 6B is a schematic view of two aircraft fuselage sections of FIG. 6A, at the level of two adjacent panels connected to each other by an orbital joining device according to the disclosed embodiments.

MORE DETAILED DESCRIPTION

Figure 1:
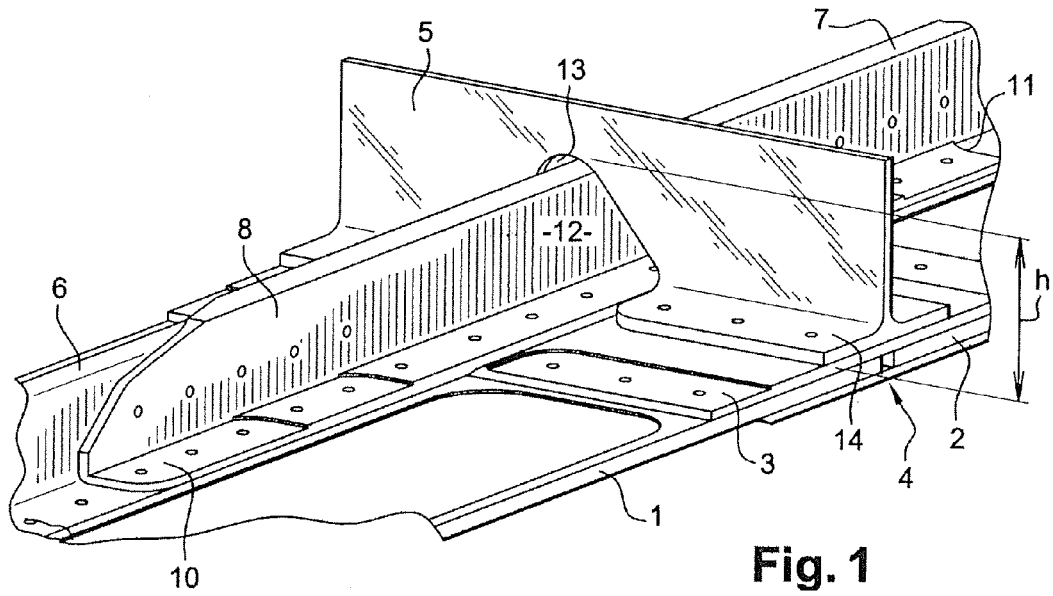
FIGS. 1 and 2 provide a schematic view of two prior art stringer splice plates, already described.
Figure 2:
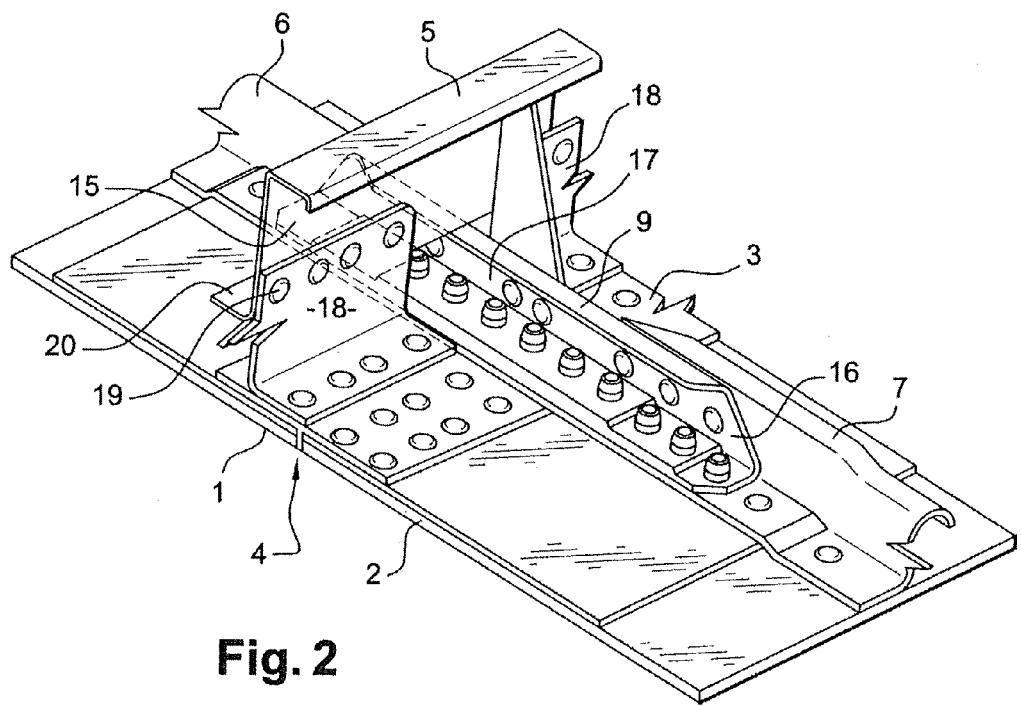
Figure 3:
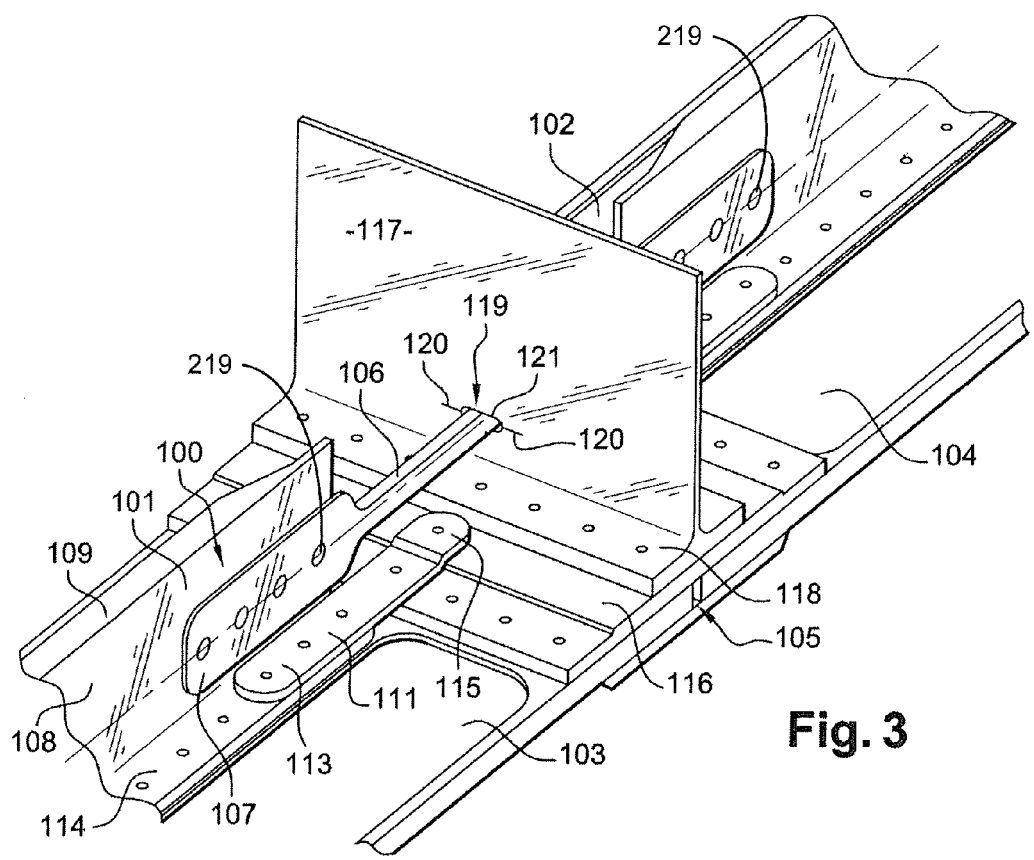

FIGS. 3 and 4 show a stringer splice plate 100 according to the disclosed embodiments.

The stringer splice plate 100 is used here to fixedly join two stringers 101 and 102 positioned one in the extension of the other and facing each other, each of the stringers 101,102 being fixedly joined to a panel 103,104. The two panels extend one in the extension of the other and are attached by one entire side in a zone of attachment 105.

The stringer splice plate 100 has a connection rod 106 spanning the space made between the two stringers 101,102. A first extremity 107 of the connection rod 106 is fixedly joined to a flank 108 of the web 109 of the first stringer 101, while the second extremity 110 of the connection rod 108 is fixedly joined to a flank 108 of the web 109 of the second stringer 102. The two extremities 107,110 of the connection rod 106 form flat ties having one element that extends in parallel to the longitudinal axis of the connection rod 6, so as to be attached on a partial length of the flanks 108 of the webs 109 of the corresponding stringers 101, 102. The term "flanks" or the term "web" in general is understood to mean the dimension extending in parallel to the longitudinal axis of the stringer. The ties 107,110 are attached by any means to the webs 109 of the stringers 101,102 for example by screws and bolts 219. A solution of this kind increases the supporting surface between the connection rod 106 and each of the stringers 101, 102.

The tie element can also extend perpendicularly to the longitudinal axis of the connection rod 6, so as to be attached on a partial height of the flanks 108 of the web 109 of the corresponding stringers, i.e. along the dimension extending vertically relative to the longitudinal axis of the stringer.

Naturally, the extremities of the rod 106 may have another shape and/or structure enabling them to be fixedly joined to a stringer splice plate 101,102. For example, each extremity of the connection rod 106 forms a horseshoe, the two arms of a horseshoe being positioned on either side of the web 109 of the stringers 101,102. Each arm of the horseshoe can be fixedly joined to an opposite flank 108 of a same web 109, by any known means.

The stringer splice plate 100 of the disclosed embodiments furthermore has two joining plates 111,112 that are physically independent of each other, as well as of the connection rod 106. Each joining plate 111,112 is fixed by a first extremity 113 to the flange 114 of a corresponding stringer 101,102 while a second extremity 115, opposite the first end, is fixedly joined to a cross-piece 116 positioned transversely in the space between the two stringers 101,102 so as to cover the attachment zone 105. The cross-piece 116, or sleeve, extends transversely relative to the longitudinal axis of the stringers 101,102. The cross-piece 116 is fixed by two opposite edges to the two joining plates 111,112 positioned on either side of the overlapping zone 105.

In the example shown in FIG. 4, the two joining plates 111,112 are placed one in the extension of the other. In other words, they each extend a same side, right-hand side or left-hand side, of flanges 114 of stringers 101,102. In another embodiment, said plates 111,112 can be fixed quincunxially, i.e. in such a way that they extend on opposite sides of the flanges 114.

The stringer splice plate 100 can be used in association with a vertical frame 116 extending perpendicularly to the longitudinal axis of said connection rod 106 and vertically from the cross-piece 116 to which the base 118 of the vertical frame 117 is fixedly joined. Such an association can be found especially when the stringer splice plate is used in an orbital joining device designed to fixedly join two aircraft fuselage panels (FIGS. 6A and 6B).

As can be seen in FIGS. 3 and 4, the flange 118 of the vertical frame 117 extends along the cross-piece 116 in the zone of attachment 105 of the two fuselage panels 103,104. Each of the joining plates 111,112 extends on either side of the vertical frame 117.

Only the connection rod 106 goes through the vertical frame 117. The connection rod 106 is therefore fixedly joined to the web 109 of the stringers 101,102 and to a certain extent to the vertical frame 117 that it crosses.

In the example described, the joining plates 111 and 112 do not go through the frame 117. The joining plates 111,112 are fixedly joined to the flange 114 of a given stringer 101, 102, as well as a lateral shoulder or side of the cross-piece 116. In another example, the joining plates 111,112 10 can extend up to the flange 118 of the frame 117 by a second fold, in order to distribute the stresses of the stringer flange more gradually.

Inasmuch as only the joining piece 106 goes through the vertical frame 117, it is possible to reduce the dimensions of the hole 119 made in the thickness of the vertical frame 117 to the minimum so as to permit the passage of the stringer splice plate 100. The hole 119 crosses the entire thickness of the vertical frame 117. The term "thickness of vertical frame" is understood to mean the dimension of said frame extending perpendicularly to the longitudinal axis of the vertical frame 117 and in parallel to the longitudinal axis of the connection rod 106. The through hole 119 advantageously has a diameter substantially equal to the diameter of the connection rod 106 so that the internal contour of said through hole 119 matches an external contour of the connection rod 106.

In one particular embodiment, such as the one shown in FIGS. 3 and 4, in order to make it easy to mount the connection rod 106 on either side of the vertical frame 117 and especially that of a joining tie 107, 110, it is possible to make the through hole 119 so that it has a hole 121, whose contour matches an external contour of the connection rod 106 and two slots 120 extending around the hole 121 and opening into said hole 121.

In the example shown in FIGS. 3 and 4, the slots 120 extend one in the extension of the other and in a diameter of the hole 121. Naturally, each of the slots 120 may extend in the extension of a different radius, or in orientations that do not follow that of the radius of the hole 121 according to the shape of the extremity of the rod 116 which has to go through the vertical frame 110.

In any case, the dimension extending between the two extremities of the two slots 120 must be sufficient to permit the passage of a flat tie 107,110 or more generally an extremity of the connection rod 106.

In the example shown in FIGS. 3 and 4, the slots 120 extend in parallel to the longitudinal axis of the vertical frame 117 so as not to penalize the mechanical strength of the vertical frame 117. It is then necessary, during the mounting stage,2 make a quarter turn of the connection rod 106 so as to make a tie 107,110 pass through the slots 120 and then turn the rod 106 back by a quarter turn so that it is in the position shown in FIGS. 3 and 4 and so that the rod 107,110 can be attached throughout its flank to a flank 108 of a web 109 of a corresponding stringer 101,102. Naturally, it is possible to make the slots 120 so that they extend perpendicularly to the longitudinal axis of the vertical frame 117. In this case, it is not necessary to make a quarter turn of the connection rod 106 during the mounting stage after passage through the through hole 119. However, this would tend to penalize the mechanical performance of the frame.

Thus, for a connection rod with a diameter equal to about 6 mm, provided at each of its extremities with a flat tie 107,110 having a width of about 20 mm, the through hole 119 made on the vertical frame 110 comprise a hole 121 with a diameter slightly greater than 6 mm so as to let through the connection rod 106 without excessive friction, and two slots 120 whose dimensions are such that the dimension spanned between the two slots 120 is about 20 mm, each of the slots 120 having a size of 7 mm on either side of the hole 121. It is thus possible to use a vertical frame 117 with a height of about 70 mm to have a working height at least equal to 63 mm. This gives a gain in height of 20 mm, since for a same working height, in the prior art, it is necessary to use a 90 mm frame to obtain a same working height of 63 mm. This reduction in height as a very major consequence from the viewpoint of the mass of the entire aircraft.

The rigid connection rod 106 transfers chiefly the stresses of the web 109 and the flange 114 of the two stringers 101, 102. The main goal of the connection rod 106 is to take up the tensile stresses but it enables a part to be played in the mechanical strength of the junction of the two stringers 101, 102 under compressive load too.

The joining plates 111,112 which may, for example, be made out of folded or machined sheet metal, provide for the continuity of the stresses from the flange 114 of the stringers 101,102. Furthermore, the joining plates 111,112 set up a junction between the flanges 114 and the cross-piece 116. The joining plates 111,112 gradually transfer the stresses borne by the flanges 114 of the stringers 101,102 towards the cross-piece 116.

The stringer splice plate 100 considerably reduces the secondary bending forces since each of the parts, namely the connection rod 106 and the joining plate 111,112 work separately. They may thus be placed as close as possible to the centers of gravity. Since each of these parts is simple in shape, they cost little to manufacture. Furthermore, inasmuch as they are fixedly joined independently of one another, they facilitate assembly and provide especially for compensation for mounting clearances.

Figure 5:
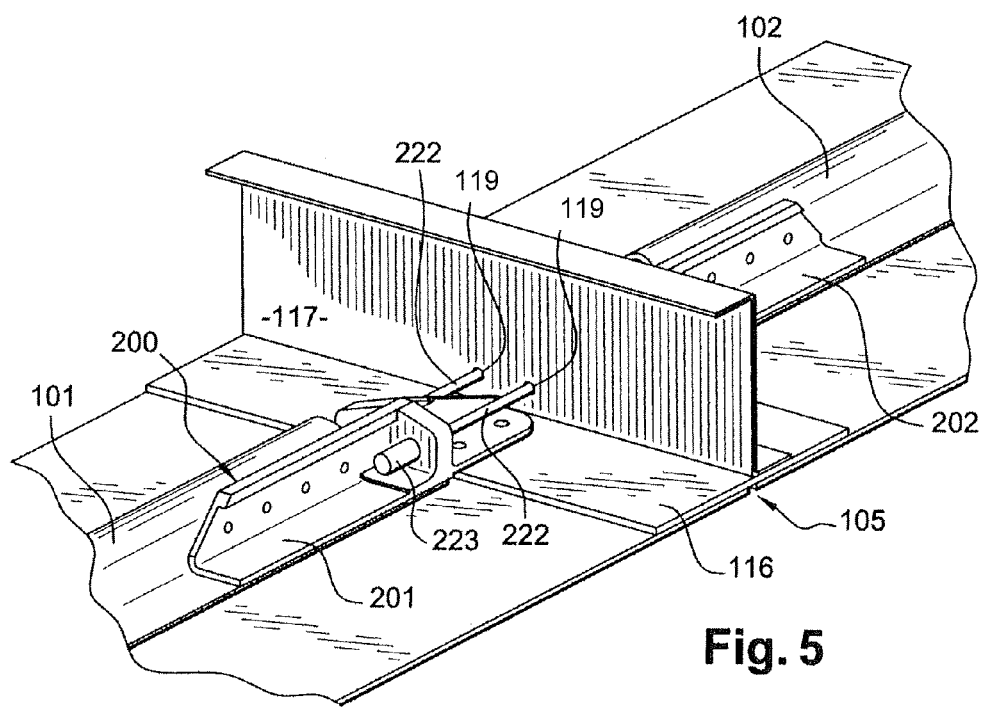
FIG. 5 is a schematic view of a stringer splice plate according to a second embodiment.

FIG. 5 shows another exemplary embodiment of a stringer splice plate 200. Elements identical to those of the exemplary embodiment of FIGS. 3 and 4 bear the same numerical references.

The stringer splice plate 200 has two joining plates 201,202 positioned on either side of the vertical frame 117. Each joining plate 201,202 is fixedly joined to a different stringer 101,102 and a longitudinal shoulder opposite the cross-piece 116.

The connection rod has two cables 222; each of the cables 222 being fixed by two opposite extremities 223 to the joining plates 201,202 positioned on either side of the vertical frame 117. Two through holes 119 are made in the vertical frame 117 so as to let said cables 222 through the frame 117. Advantageously, each through hole 119 has a diameter substantially equal to the diameter of the cable 222 that goes through it, so that an external contour of the table 222 matches an internal contour of the corresponding through hole 119. Thus, the dimensions of the through hole 119 are reduced to the minimum so as to not penalize the working height of the vertical frame 117. Naturally, it is possible to use only one cable 222 or more than two cables. Similarly, the cables 222 may have a same diameter or different diameters throughout a part of the length of the cable.

The cables 222 are herein fixedly joined to each of the stringers 101,102 by means of joining plates 201,202 to which they are fixed. An embodiment of this kind may, for example, be used in the zones subject to low compressive forces, such as the roof of the fuselage. The compressive forces are then taken up by the joining parts 201, 202 forming shovel-type metal fittings.

FIG. 6A shows a fuselage 130 of an aircraft broken up into several successive sections 131. Each of the sections 131 has to be fixedly joined to the adjacent sections extending in its longitudinal extension.

Two adjacent sections that are facing can thus be fixedly joined to each other by means of the orbital joining device according to the disclosed embodiments, as shown in FIG. 6B.

The two plates 103,104 belong to two facing fuselage sections 131 and are attached to each other in a zone of attachment 105. A cross-piece or sleeve 116 is positioned transversely in the attached zone 105 so as to overlap said zone of attachment 105 from the internal volume of the fuselage sections 131. The sleeve 116 forms a plate with a circular cross-section whose external diameter is substantially equal to the internal diameter of the fuselage sections 131.

A vertical frame 117 spans the internal volume of the fuselage sections 131, transversely relative to the longitudinal axis of said fuselage sections 131 so as to rigidify the link between the fuselage panels 103,104 and the sleeve 116. Each panel 103,104 is stiffened by several stringers 101,102 extending longitudinally on the inner skin of said panels 103,104. The two panels 103 and 104 are attached in such a way that one extremity of a stringer 101 on a panel 103 coincides with one extremity of a string 102 on the other panel 104. Each pair of facing stringers 101,102 is fixedly joined by a string splice plate 100 according to the disclosed embodiments.

Thus, the continuity of the link between the stringers 101, 102 of two aircraft fuselage sections 131 is provided both at the level of the physical structure and at that of the transmission of the stresses traveling through the stringers 101,102.

Furthermore, the stringers splice plate 100 maintains the alignment of the facing stringers 101 and achieves this despite the bending stresses to which the fuselage sections 131 are subjected.

What is claimed is:

1. A stringer splice plate designed to connect two adjacent stringers, the stringer splice plate comprising at least three independent parts, one connection rod being fixed by two opposite extremities to the two adjacent stringers where the connection rod and the two opposite extremities have a common longitudinal axis, and at least two joining plates, each joining plate being fixedly joined by a first extremity of one of the two stringers, and by a second extremity of a cross-piece positioned between the two stringers, the cross-piece extending in a horizontal position relative to a vertical frame so as to cover an attachment zone where the two adjacent stringers are separated from each other by the vertical frame, and a plurality of fasteners penetrating each of said extremities substantially perpendicular to said longitudinal axis, whereby each of said extremities are connected to said stringers in a manner to prohibit relative rotation between said stringers and said rod or said extremities.

2. The stringer splice plate according to claim 1, wherein the first extremity of a joining plate can be fixedly joined to the flange of a stringer, so as to extend at least partially along the flange and in the extension of said flange.

3. The stringer splice plate according to one of the claim 1, wherein the connection rod comprises at least one rigid bar extending between the two stringers.

4. The stringer splice plate according to claim 1, wherein the connection rod has at least one cable designed to extend between the two stringers.

5. The stringer splice plate according to one of the claim 1, wherein at least one extremity of the connection rod is capable of being connected to a web of a stringer.

6. The stringer splice plate according to one of the claim 1, wherein at least one extremity of the connection rod comprises at least one flat tie designed to be attached to a web of a stringer, so as to extend along said web.

7. An orbital joining device to fixedly join two fuselage panels facing each other, perpendicularly to the longitudinal axis of said fuselage, comprising at least one stringer splice plate, capable of fixedly joining two longitudinal stringers each extending on a different fuselage panel and facing each other, the at least one stringer splice plate including one connection rod being fixed by two opposite extremities to the two adjacent stringers where the connection rod and the two opposite extremities have a common longitudinal axis, and at least two joining plates, each joining plate being fixedly joined by a first extremity of one of the two stringers, and by a second extremity of a cross-piece positioned between the two stringers, the cross-piece extending in a horizontal position relative to a vertical frame so as to cover an attachment zone where the two adjacent stringers are separated from each other by the vertical frame, and a plurality of fasteners penetrating each of said extremities substantially perpendicular to said longitudinal axis, whereby each of said extremities are connected to said stringers in a manner to prohibit relative rotation between said stringers and said rod or said extremities.

8. The Orbital joining device according to claim 7, wherein the connection rod of the stringer splice plate goes through the vertical frame extending transversely relative to a longitudinal axis of the stringer splice plate, said vertical frame being positioned in the zone of attachment of the two fuselage panels, between the two facing stringers.

9. The orbital joining device according to claim 7, wherein the at least two joining plates are positioned on either side of the vertical frame extending transversely relative to a longitudinal axis of the stringer splice plate, said vertical frame being positioned in the zone of attachment of the two fuselage panels, between the two facing stringers.

10. The orbital joining device according to one of the claim 7, wherein the vertical frame is provided with a through hole capable of letting through the connection rod of the stringer splice plate.

11. The Orbital joining device according to claim 10, wherein the through hole comprises a hole with a diameter substantially equal to the diameter of the rigid bar of the connection rod that goes through the hole, and two slots, made around the hole and opening into the hole, the size of the orifice that extends between the two slots being substantially equal to the size of one extremity of the connection rod, so as to permit the passage of said extremity through the vertical frame.

12. The Orbital joining device according to claim 11, wherein the slots extend in parallel to the longitudinal axis of the vertical frame.

13. The orbital joining device according to claim 10, wherein the through hole comprises a hole with a diameter substantially equal to the diameter of the cable of the connection rod that goes through the hole, and two slots, made around the hole and opening into the hole, the size of the orifice that extends between the two slots being substantially equal to the size of one extremity of the connection rod, so as to permit the passage of said extremity through the vertical frame.

14. The orbital joining device according to claim 13, wherein the slots extend in parallel to the longitudinal axis of the vertical frame.

15. The orbital joining device according to claim 10, wherein the through hole comprises a hole with a diameter substantially equal to the diameter of the rigid bar of the connection rod that goes through the hole, the cable of the connection rod that goes through the hole, and two slots, made around the hole and opening into the hole, the size of the orifice that extends between the two slots being substantially equal to the size of one extremity of the connection rod, so as to permit the passage of said extremity through the vertical frame.

16. The orbital joining device according to claim 15, wherein the slots extend in parallel to the longitudinal axis of the vertical frame.

* * * * *

UNITED STATES PATENT AND TRADEMARK OFFICE
CERTIFICATE OF CORRECTION

| | | |
|---|---|---|
| PATENT NO. | : 7,823,362 B2 | Page 1 of 1 |
| APPLICATION NO. | : 11/855197 | |
| DATED | : November 2, 2010 | |
| INVENTOR(S) | : Cedric Meyer | |

It is certified that error appears in the above-identified patent and that said Letters Patent is hereby corrected as shown below:

First Page, Col. 1, Below "(65) Prior Publication Data", insert -- (30) Foreign Application Priority Data Sep. 15, 2006 (FR) 2006-53751 --.

Col. 9, Claim 3, line 40, delete "one of the".

Col. 9, Claim 5, line 46, delete "one of the".

Col. 9, Claim 6, line 49, delete "one of the".

Col. 10, Claim 10, line 22, delete "one of the".

Signed and Sealed this
Eighth Day of March, 2011

David J. Kappos
*Director of the United States Patent and Trademark Office*